(12) United States Patent
Shows et al.

(10) Patent No.: US 9,606,593 B2
(45) Date of Patent: Mar. 28, 2017

(54) SYSTEMS AND METHODS FOR MANAGEMENT OF SURFACE TEMPERATURE IN AN INFORMATION HANDLING SYSTEM

(71) Applicant: Dell Products L.P., Round Rock, TX (US)

(72) Inventors: Thomas Alexander Shows, Cedar Park, TX (US); Travis C. North, Cedar Park, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/811,419

(22) Filed: Jul. 28, 2015

(65) Prior Publication Data
US 2017/0031397 A1  Feb. 2, 2017

(51) Int. Cl.
*G06F 1/20* (2006.01)
(52) U.S. Cl.
CPC ............... *G06F 1/206* (2013.01); *G06F 1/20* (2013.01); *G06F 1/203* (2013.01)
(58) Field of Classification Search
None
See application file for complete search history.

(56) References Cited

U.S. PATENT DOCUMENTS

| | | | |
|---|---|---|---|
| 2008/0140259 A1* | 6/2008 | Bash | G05D 23/192 700/278 |
| 2011/0176273 A1 | 7/2011 | Olsen et al. | |
| 2011/0277967 A1* | 11/2011 | Fried | F28D 15/0266 165/104.26 |
| 2013/0106265 A1 | 5/2013 | Shelnutt et al. | |
| 2013/0112378 A1 | 5/2013 | Shelnutt et al. | |

* cited by examiner

*Primary Examiner* — Ryan Jarrett
(74) *Attorney, Agent, or Firm* — Jackson Walker L.L.P.

(57) ABSTRACT

In accordance with embodiments of the present disclosure, a method may include determining an amount of power of heat transfer between at least one information handling resource and an enclosure housing the at least one information handling resource based on an intake temperature associated with an intake of heat-rejecting media thermally coupled to the at least one information handling resource for transferring heat generated by the at least one information handling resource from the intake to an exhaust associated with the heat-rejecting media and an exhaust temperature associated with the exhaust. The method may also include controlling at least one of an operating frequency of the at least one information handling resource and a flow rate of fluid proximate to the heat-rejecting media based on the amount of power of heat transfer.

21 Claims, 2 Drawing Sheets

SYSTEMS AND METHODS FOR MANAGEMENT OF SURFACE TEMPERATURE IN AN INFORMATION HANDLING SYSTEM

TECHNICAL FIELD

The present disclosure relates in general to information handling systems, and more particularly to thermal control of a surface or skin of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Such heat may be absorbed by other components of an information handling system, including an enclosure of the information handling system. As a result, an information handling system enclosure may reach a temperature that may become unsafe or uncomfortable for a user to handle, particularly for notebooks, laptops, handheld devices, and similar devices which are often used while being held by a user. For example, in some instances it is desirable to maintain a temperature of an information handling system enclosure below 55° C. for purposes of user comfort. Accordingly, systems and methods for managing heat transfer between heat-producing components of an information handling system and an enclosure thereof are desirable. Existing approaches require a closed loop control using dedicated enclosure temperature sensors to directly measure or infer surface temperature in order to thermally manage an information handling system. However, use of such dedicated sensors are often undesirable.

SUMMARY

In accordance with the teachings of the present disclosure, the disadvantages and problems associated with heat transfer from information handling resources of an information handling system to an enclosure thereof may be substantially reduced or eliminated.

In accordance with embodiments of the present disclosure, an information handling system may include at least one information handling resource, heat-rejecting media, an intake temperature sensor, an exhaust temperature sensor, and a program of instructions embodied in computer-readable media and executable by a processor. The heat-rejecting media may be thermally coupled to the at least one information handling resource for transferring heat generated by the at least one information handling resource from an intake associated with the heat-rejecting media to an exhaust associated with the heat-rejecting media. The intake temperature sensor may be configured to sense an intake temperature proximate to the intake and the exhaust temperature sensor may be configured to sense an exhaust temperature proximate to the exhaust. The program of instructions may be configured to determine an amount of power of heat transfer between the at least one information handling resource and an enclosure housing the at least one information handling resource based on the intake temperature and the exhaust temperature and control at least one of an operating frequency of the at least one information handling resource and a flow rate of fluid proximate to the heat-rejecting media based on the amount of power of heat transfer.

In accordance with these and other embodiments of the present disclosure, a method may include determining an amount of power of heat transfer between at least one information handling resource and an enclosure housing the at least one information handling resource based on an intake temperature associated with an intake of heat-rejecting media thermally coupled to the at least one information handling resource for transferring heat generated by the at least one information handling resource from the intake to an exhaust associated with the heat-rejecting media and an exhaust temperature associated with the exhaust. The method may also include controlling at least one of an operating frequency of the at least one information handling resource and a flow rate of fluid proximate to the heat-rejecting media based on the amount of power of heat transfer.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to determine an amount of power of heat transfer between at least one information handling resource and an enclosure housing the at least one information handling resource based on an intake temperature associated with an intake of heat-rejecting media thermally coupled to the at least one information handling resource for transferring heat generated by the at least one information handling resource from the intake to an exhaust associated with the heat-rejecting media and an exhaust temperature associated with the exhaust. The instructions may also cause the processor to control at least one of an operating frequency of the at least one information handling resource and a flow rate of fluid proximate to the heat-rejecting media based on the amount of power of heat transfer.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
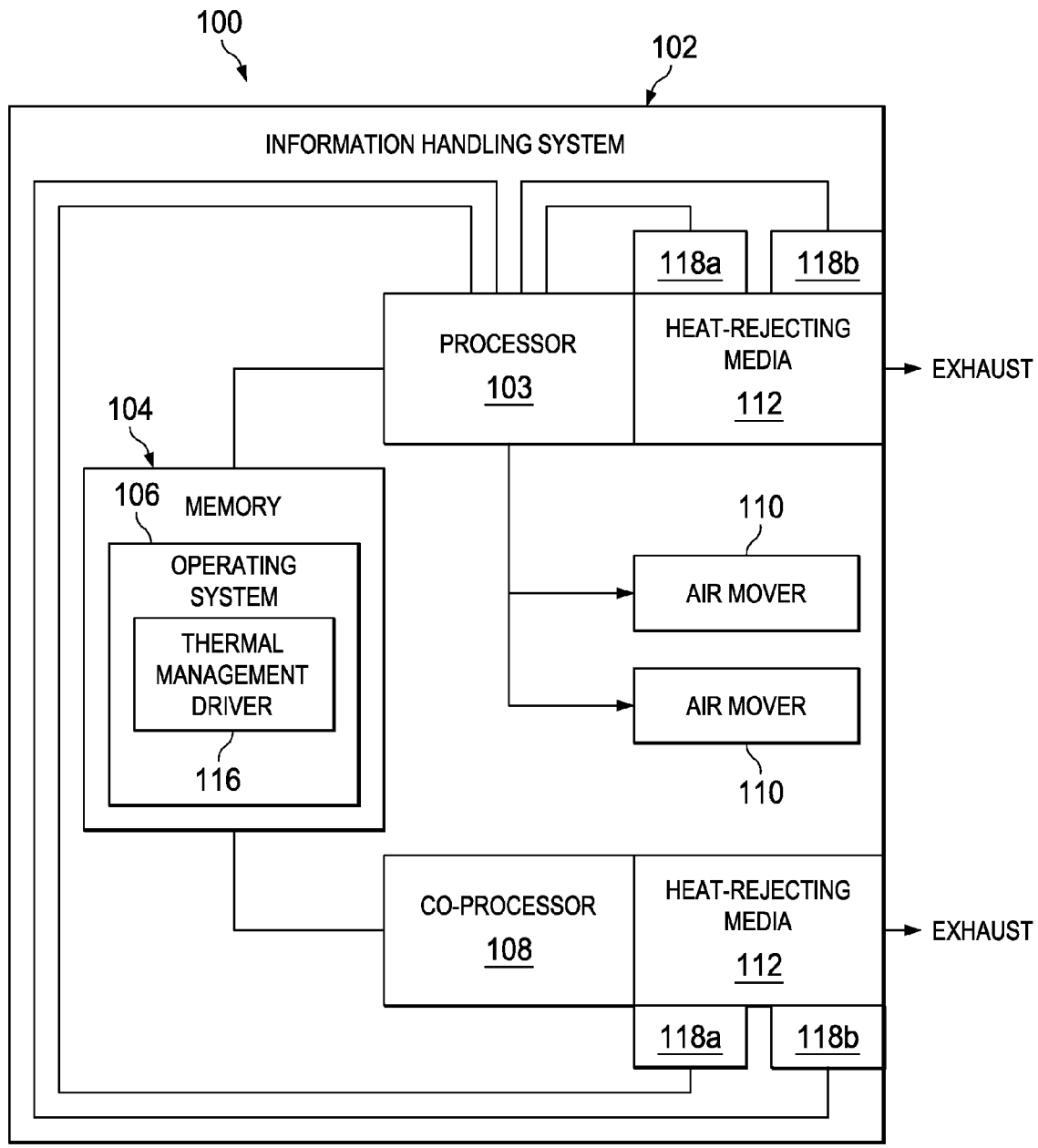
FIG. 1 illustrates a block diagram of an example information handling system, in accordance with certain embodiments of the present disclosure.
Figure 2:
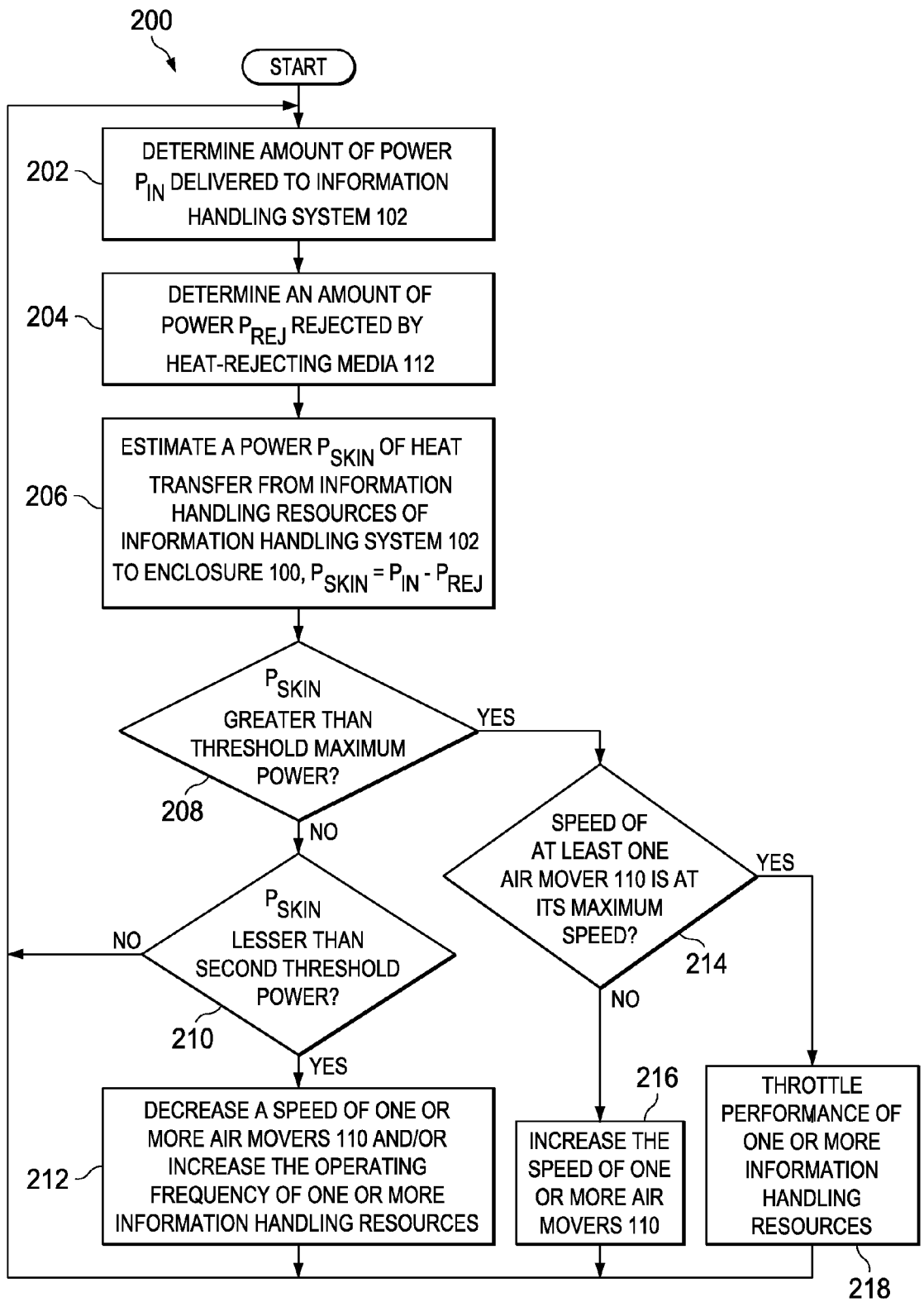
FIG. 2 illustrates a flow chart of an example method for managing heat transfer from information handling resources of an information handling system to an enclosure housing the information handling resources, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include an enclosure 100 housing a plurality of information handling resources including, without limitation, processor 103, a memory 104 communicatively coupled to processor 103, a co-processor 108 communicatively coupled to processor 103 and memory 104, one or more air movers 110, heat-rejecting media 112 thermally coupled to each processor 103 and co-processor 108, and a plurality of temperature sensors 118a and 118b (which may be referred to collectively as "temperature sensors 118" or individually as a "temperature sensor 118") thermally coupled to heat-rejecting media 112 and communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include a thermal management driver 116. Thermal management driver 116 may comprise a program of instructions configured to, when read and executed by processor 103, provide an interface between operating system 106 and processor 103 and co-processor 108 to control performance (e.g., operating frequency) of processor 103 and co-processor 108. As described in greater detail below, driver 116 may, based on thermal information communicated from temperature sensors 118 and an amount of power delivered to information handling system 102 or components (processor 103 and co-processor 108) thereof, control the operation of air movers 110 and/or operating frequencies of processor 103 and co-processor 108 to ensure that a surface temperature of enclosure 100 does not exceed thermal limits.

Although operating system 106 is depicted as being stored on memory 104, in some embodiments, operating system 106 may be stored on a computer-readable medium other than memory 104, and read into memory 104 for execution by processor 103. In addition, although thermal management is shown and described as being undertaken by a driver executing on operating system 106, such thermal management may also be undertaken by an application program or another controller (e.g., a management controller such as a baseboard management controller, chassis management controller, enclosure controller, or similar controller).

Co-processor 108 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, co-processor 103 may interpret and/or execute program instructions and/or process data stored in memory 104 and/or another component of information handling system 102. In these and other embodiments, co-processor 108 may be a special-purpose processor for executing specialized or particular instructions, such as a graphics processing unit configured to rapidly manipulate and alter memory (e.g., memory 104) to accelerate the creation of images in a frame buffer intended for output to a display.

An air mover 110 may be communicatively coupled to processor 103, and may include any mechanical or electromechanical system, apparatus, or device operable to move air and/or other gasses. In some embodiments, an air mover 110 may comprise a fan (e.g., a rotating arrangement of vanes or blades which act on the air). In other embodiments, an air mover 110 may comprise a blower (e.g., a centrifugal fan that employs rotating impellers to accelerate air received at its intake and change the direction of the airflow). In these and other embodiments, rotating and other moving components of air mover 110 may be driven by a motor. The rotational speed of such motor may be controlled by suitable control signals communicated from processor 103 or a controller of air mover 110 in communication with processor 103. In operation, air mover 110 may cool information handling resources of information handling system 102 by drawing cool air into enclosure 100, expelling warm air from inside the enclosure to the outside of such enclosure, and/or move air across heat-rejecting media 112 internal to enclosure 100 to cool one or more information handling resources (e.g., processor 103 and/or co-processor 108).

Heat-rejecting media 112 may include any system, device, or apparatus configured to transfer heat from an information handling resource, thus reducing a temperature of the information handling resource. For example, heat-rejecting media 112 may include a fluid conveyed proximate to an information handling resource (e.g., air conveyed by a fan or blower, liquid conveyed via a liquid conduit by a pump, etc.), a solid thermally coupled to the information handling resource (e.g., heatpipe, heat spreader, heatsink, finstack, etc.).

A temperature sensor 118 may comprise any system, device, or apparatus (e.g., a thermometer, thermistor, etc.) configured to communicate a signal to processor 103 indicative of a temperature within information handling system 102. For example, a temperature sensor 118a may sense a temperature (e.g., of air) within and/or proximate to an intake of heat-rejecting media 112 while a temperature sensor 118b may sense a temperature (e.g., of air) exhausted from heat-rejecting media 112 to the outside of enclosure 100.

In addition to processor 103, memory 104, co-processor 108, air movers 110, and temperature sensors 118, information handling system 102 may include one or more other information handling resources.

FIG. 2 illustrates a flow chart of an example method 200 for managing heat transfer from information handling resources of an information handling system to an enclosure housing the information handling resources, in accordance with certain embodiments of the present disclosure. According to some embodiments, method 200 may begin at step 202. As noted above, teachings of the present disclosure may be implemented in a variety of configurations of information handling system 102.

At step 202, thermal management driver 116 may determine an amount of power $P_{in}$ delivered to information handling system 102 (e.g., via a power supply unit coupled to an external source of electrical energy).

At step 204, thermal management driver 116 may determine an amount of power rejected by heat-rejecting media 112. For example, the amount of power $P_{rej}$ rejected by heat-rejecting media 112 may be given by:

$$P_{rej} = \dot{m} C_p (T_{exhaust} - T_{intake})$$

where $\dot{m}$ is a mass flow rate of air moved by an air mover 110 (which may be calculated from a speed of such air mover 110 and known properties of air), $C_p$ is a heat capacity of the air, $T_{exhaust}$ is a temperature at an exhaust of heat-rejecting media 112 (e.g., as sensed by a temperature sensor 118b) and $T_{intake}$ is a temperature at an intake of heat-rejecting media 112 (e.g., as sensed by a temperature sensor 118a).

At step 206, thermal management driver 116 may estimate a power $P_{skin}$ of heat transfer from information handling resources of information handling system 102 to enclosure 100 by taking the difference between the amount of power $P_{in}$ delivered to information handling system 102 and the amount of power $P_{rej}$ rejected by heat-rejecting media 112. Accordingly, rather than a dedicated temperature sensor for sensing surface temperature of enclosure 100, the estimate of power of heat transfer from information handling resources of information handling system 102 to enclosure 100 may be used as a proxy for the surface temperature.

At step 208, thermal management driver 116 may compare the estimated power $P_{skin}$ to a threshold maximum power. If $P_{skin}$ is greater than the threshold maximum power, method 200 may proceed to step 214. Otherwise, method 200 may proceed to step 210.

At step 210, responsive to the estimated power $P_{skin}$ being lesser than the threshold maximum power, thermal management driver 116 may compare the estimated power $P_{skin}$ to a second threshold power lower than the threshold maximum power. If $P_{skin}$ is greater than the second threshold power, method 200 may proceed again to step 202. Otherwise, method 200 may proceed to step 212.

At step 212, responsive to the estimated power $P_{skin}$ being lesser than the second threshold power, thermal management driver 116 may decrease a speed of one or more air movers 110 and/or increase the operating frequency of one or more information handling resources (e.g., processor 103 and/or co-processor 108). After completion of step 212, method 200 may proceed again to step 202.

At step 214, responsive to the estimated power $P_{skin}$ being greater than the threshold maximum power, thermal management driver 116 may determine if a speed of at least one air mover 110 is at its maximum speed. If a speed of at least one air mover 110 is at its maximum speed, method 200 may proceed to step 218. Otherwise, method 200 may proceed to step 216.

At step 216, thermal management driver 116 may increase the speed of one or more air movers 110. After completion of step 216, method 200 may proceed again to step 202.

At step 218, thermal management driver 116 may throttle performance of one or more information handling resources (e.g., processor 103 and/or co-processor 108) of information handling system 102. After completion of step 218, method 200 may proceed again to step 202.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although method 200 as described above applies thermal control and management at a system level, in some embodiments, thermal control may be at a more granular level within the system. For example, in some embodiments, thermal control and management may be bifurcated between heat generated by processor 103 and heat generated by co-processor 108. For each of processor 103 and co-processor 108, thermal management driver 116 may determine power of heat transfer from such component to enclosure 100, and based thereon, control speed of individual air movers 110 respectively associated with each of processor 103 and co-processor 108 and/or control frequency of each of processor 103 and co-processor 108. To further illustrate, with respect to processor 103, its respective amount of power $P_{rej}$ rejected by heat-rejecting media 112 may be calculated based on a massflow rate of an air mover 110 proximate to processor 103 and a temperature difference between exhaust and intake of heat-rejecting media 112 thermally coupled to processor 103. In addition, the estimated power $P_{skin}$ for processor 103 may be equal to a difference between an amount of power delivered to processor 103 and its respective amount of power $P_{rej}$ rejected by heat-rejecting media 112.

Although the systems and methods described herein contemplate management of a surface temperature of an information handling system using a thermal management driver 116 implemented in software executing on an operating system, in other embodiments, one or more other information handling resources may carry out the functionality similar or identical to that of thermal management module 116 as described herein. For example, in some embodiments, such functionality may be implemented in hardware, software, and/or firmware integral to a Super I/O chip, a controller embedded in information handling system, a baseboard management controller (e.g., a Dell Remote Access Controller or Integrated Dell Remote Access Controller), a chassis management controller, enclosure controller, or any other suitable information handling resource.

As used herein, when two or more elements are referred to as "coupled" to one another, such term indicates that such two or more elements are in electronic communication, thermal communication, or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   at least one information handling resource;
   heat-rejecting media thermally coupled to the at least one information handling resource for transferring heat generated by the at least one information handling resource from an intake associated with the heat-rejecting media to an exhaust associated with the heat-rejecting media;
   an intake temperature sensor for sensing an intake temperature proximate to the intake;
   an exhaust temperature sensor for sensing an exhaust temperature proximate to the exhaust; and
   a program of instructions embodied in computer-readable media and executable by a processor, the instructions configured to:
     determine an amount of power of heat transfer between the at least one information handling resource and an enclosure housing the at least one information handling resource based on the intake temperature and the exhaust temperature; and
     control at least one of an operating frequency of the at least one information handling resource and a flow rate of fluid proximate to the heat-rejecting media based on the amount of power of heat transfer.

2. The information handling system of claim 1, the instructions further configured to determine the amount of power of heat transfer based on at least one of the flow rate of fluid and an amount of power consumed by the at least one information handling resource.

3. The information handling system of claim 1, wherein the fluid comprises air, and the instructions are further configured to control the flow rate of fluid by controlling a speed associated with an air mover for driving the air.

4. The information handling system of claim 3, wherein the instructions are further configured to decrease an operating frequency of the at least one information handling system responsive to determining that the amount of power of heat transfer is greater than a maximum threshold power and determining that the speed is at a maximum speed.

5. The information handling system of claim 1, wherein the instructions are is further configured to decrease an operating frequency of the at least one information handling system responsive to determining that the amount of power of heat transfer is greater than a maximum threshold power.

6. The information handling system of claim 1, wherein the instructions are further configured to increase the flow rate of fluid responsive to determining that the amount of power of heat transfer is greater than a maximum threshold power.

7. The information handling system of claim 1, wherein the at least one information handling resource includes at least one of the processor, a processor other than the processor, and a graphics processing unit.

8. A method comprising:
  determining an amount of power of heat transfer between at least one information handling resource and an enclosure housing the at least one information handling resource based on:
    an intake temperature associated with an intake of heat-rejecting media thermally coupled to the at least one information handling resource for transferring heat generated by the at least one information handling resource from the intake to an exhaust associated with the heat-rejecting media; and
    an exhaust temperature associated with the exhaust; and
  controlling at least one of an operating frequency of the at least one information handling resource and a flow rate of fluid proximate to the heat-rejecting media based on the amount of power of heat transfer.

9. The method of claim 8, wherein determining the amount of power of heat transfer is further based on at least one of the flow rate of fluid and an amount of power consumed by the at least one information handling resource.

10. The method of claim 8, wherein the fluid comprises air, and the method further comprises controlling the flow rate of fluid by controlling a speed associated with an air mover for driving the air.

11. The method of claim 10, wherein controlling at least one of an operating frequency of the at least one information handling resource and a flow rate of fluid comprises decreasing an operating frequency of the at least one information handling system responsive to determining that the amount of power of heat transfer is greater than a maximum threshold power and determining that the speed is at a maximum speed.

12. The method of claim 8, wherein controlling at least one of an operating frequency of the at least one information handling resource and a flow rate of fluid comprises decreasing an operating frequency of the at least one information handling system responsive to determining that the amount of power of heat transfer is greater than a maximum threshold power.

13. The method of claim 8, wherein controlling at least one of an operating frequency of the at least one information handling resource and a flow rate of fluid comprises increasing the flow rate of fluid responsive to determining that the amount of power of heat transfer is greater than a maximum threshold power.

14. The method of claim 8, wherein the at least one information handling resource includes at least one of a processor and a graphics processing unit.

15. An article of manufacture comprising:
  a non-transitory computer-readable medium; and
  computer-executable instructions carried on the computer-readable medium, the instructions readable by a processor, the instructions, when read and executed, for causing the processor to:
    determine an amount of power of heat transfer between at least one information handling resource and an enclosure housing the at least one information handling resource based on:
      an intake temperature associated with an intake of heat-rejecting media thermally coupled to the at least one information handling resource for transferring heat generated by the at least one information handling resource from the intake to an exhaust associated with the heat-rejecting media; and
      an exhaust temperature associated with the exhaust; and
    control at least one of an operating frequency of the at least one information handling resource and a flow rate of fluid proximate to the heat-rejecting media based on the amount of power of heat transfer.

16. The article of claim 15, wherein determining the amount of power of heat transfer is further based on at least one of the flow rate of fluid and an amount of power consumed by the at least one information handling resource.

17. The article of claim 15, wherein the fluid comprises air, and the instructions further cause the processor to control the flow rate of fluid by controlling a speed associated with an air mover for driving the air.

18. The article of claim 17, wherein the instructions further cause the processor to control at least one of an operating frequency of the at least one information handling resource and a flow rate of fluid comprises decreasing an operating frequency of the at least one information handling system responsive to determining that the amount of power of heat transfer is greater than a maximum threshold power and determining that the speed is at a maximum speed.

19. The article of claim 15, wherein the instructions further cause the processor to control at least one of an operating frequency of the at least one information handling resource and a flow rate of fluid comprises decreasing an operating frequency of the at least one information handling system responsive to determining that the amount of power of heat transfer is greater than a maximum threshold power.

20. The article of claim 15, wherein the instructions further cause the processor to control at least one of an operating frequency of the at least one information handling resource and a flow rate of fluid comprises increasing the flow rate of fluid responsive to determining that the amount of power of heat transfer is greater than a maximum threshold power.

21. The article of claim 15, wherein the at least one information handling resource includes at least one of the processor, a processor other than the processor, and a graphics processing unit.

* * * * *